United States Patent
Häring et al.

(10) Patent No.: US 9,403,195 B2
(45) Date of Patent: Aug. 2, 2016

(54) BLOWING ASSEMBLY FOR A SEALING UNIT OF A PACKAGING DEVICE

(71) Applicant: Multivac Sepp Haggenmüller GmbH & Co. KG, Wolfertschwenden (DE)

(72) Inventors: Rainer Häring, Lauben (DE); Thomas Scheufele, Erkheim (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 533 days.

(21) Appl. No.: 13/870,894

(22) Filed: Apr. 25, 2013

(65) Prior Publication Data
US 2013/0284214 A1    Oct. 31, 2013

(30) Foreign Application Priority Data

Apr. 27, 2012  (EP) .................................. 12003000

(51) Int. Cl.

| | |
|---|---|
| *A47L 5/00* | (2006.01) |
| *B08B 5/02* | (2006.01) |
| *B65B 51/14* | (2006.01) |
| *B29C 65/74* | (2006.01) |
| *B29C 65/00* | (2006.01) |
| *B65B 31/02* | (2006.01) |
| *B65B 61/00* | (2006.01) |
| *B65B 65/06* | (2006.01) |
| *B29C 65/02* | (2006.01) |

(52) U.S. Cl.
CPC .................. *B08B 5/02* (2013.01); *B29C 65/745* (2013.01); *B29C 65/749* (2013.01); *B29C 66/0044* (2013.01); *B29C 66/1122* (2013.01); *B29C 66/43121* (2013.01); *B29C 66/8122* (2013.01); *B29C 66/8322* (2013.01); *B29C 66/849* (2013.01); *B65B 31/024* (2013.01); *B65B 51/146* (2013.01); *B65B 61/005* (2013.01); *B65B 65/06* (2013.01); *B29C 65/02* (2013.01); *B29C 65/7451* (2013.01); *B29C 66/00441* (2013.01)

(58) Field of Classification Search
None
See application file for complete search history.

(56) References Cited

U.S. PATENT DOCUMENTS 3,699,742 A    10/1972    Giraudi

FOREIGN PATENT DOCUMENTS

| CN | 1114284 A | 1/1996 |
| CN | 1843852 A | 10/2006 |
| DE | 102008015691 B3 | 4/2010 |

*Primary Examiner* — Eric Golightly
(74) *Attorney, Agent, or Firm* — Husch Blackwell LLP

(57) ABSTRACT

A blowing assembly for a sealing unit of a packaging device is provided comprising a housing and at least one blowing element which is movable relative to said housing between a first position, in which it is lowered at least partially into said housing, and a second position in which it at least partially projects above a surface of said housing. Also provided is a method for removing excess packing material from a blowing assembly for a sealing unit being provided in a packaging device.

14 Claims, 10 Drawing Sheets

BLOWING ASSEMBLY FOR A SEALING UNIT OF A PACKAGING DEVICE

CROSS-REFERENCE TO RELATED APPLICATIONS

This application claims priority to European Application Number 12003000.2 filed Apr. 27, 2012, to Rainer Hä ring and Thomas Scheufele entitled "Blowing Assembly for a Sealing Unit of a Packaging Device," currently pending, the entire disclosure of which is incorporated herein by reference.

FIELD OF THE INVENTION

The present invention relates to a blowing assembly for a sealing unit of a packaging device, as well as to a method for removing excess packing material.

BACKGROUND OF THE INVENTION

A device and a method for packaging products in bags are known from the applicant's DE 10 2008 015 691 B3, the content of which is hereby incorporated by reference its entirety. It is disclosed therein, that a cover is raised following a sealing process and a cutting process, in order to initially partially open a gap to an extractor, wherein severed bag necks are by means of a compressed air device provided in a chamber conveyor belt machine blown through the gap into the extractor. To improve removal of the severed bag necks in the extractor, a suction device is additionally provided. By raising the cover, a frame member of the chamber conveyor belt machine can by means of a carrier be raised to completely open the gap to the extractor. It is thereby possible to also remove larger bag necks through the enlarged gap.

It is problematic, however, that the severed bag necks are difficult to remove from the abutment by means of the compressed-air device and additionally by means of the suction device provided in the chamber conveyor belt machine. Above all, it has been found in practice that bag necks partially cling on or stick to the abutment, thereby causing an undesirable accumulation of severed bag necks on the abutment in the chamber conveyor belt machine. At worst, it can happen that the gap to the extractor is clogged, thereby creating the risk that the chamber conveyor belt machine can no longer be hermetically sealed for evacuation or gassing.

Moreover, it is with difficulty realized to provide such a compressed air device in the chamber conveyor belt such that it can specifically blow the excess bag necks from the abutment through the gap into the extractor.

SUMMARY OF THE INVENTION

Consequently, the present invention has the objective to provide a device and a method by means of simple and inexpensive technical features, by means of which bag residue removal can be optimized, in particular for chamber conveyor belt machines.

The invention relates generally to a blowing assembly for a sealing unit of a packaging device, comprising a housing and at least one blowing element. It is provided according to one embodiment of the invention that the blowing element is movable relative to the housing between a first position, in which it is lowered at least partially into the housing, and a second position in which it at least partially projects above a surface of the housing.

The blowing assembly according to the invention offers a simple and inexpensive solution for reliably removing excess packaging materials such as severed bag necks. In addition, the blowing assembly of the invention offers a space-saving solution which is usable without significant design effort in a packaging machine, such as a chamber conveyor belt machine Previously used compressed air devices and/or blowing devices, as are known from above cited prior art, can effectively and easily be replaced by the blowing assembly according to the invention.

Above all, the blowing assembly of the invention has proven to be effective for reliably removing both short as well as long severed bag necks from a sealing unit. The blowing assembly of the invention can perform this with or without the support of an additional compressed air and/or suction device of the type described above.

Furthermore, it is by means of the blowing assembly according to the invention possible to remove the severed bag necks from the blowing assembly within a short time. In this manner, the packaging times by the packaging device can be improved by using the blowing assembly according to the invention.

The blowing assembly has proven to be especially effective for the removal of bag necks that are particularly persistent in clinging on to the blowing assembly or an abutment being part of the sealing unit, respectively, after the sealing and cutting operation, for example, because they adhere to a surface of the abutment.

In one embodiment, the blowing element is or comprises a blowing rail or at least a blowing pin. By means of the blowing rail, it is possible to raise the severed bag necks particularly well across the entire width of the blowing assembly, so that the severed bag necks can be reliably detached from the surface of the blowing assembly. The blowing rail is particularly advantageous when the severed bag necks are partially stuck to the sealing unit. One or more blowing pins have the advantage that they are adjustable in a particularly responsive manner from the first to the second position due to their relatively low weight.

According to another embodiment of the invention, it is provided that the blowing element is arranged flush with the surface of the housing when it is in the first position. This ensures that the packaging material can be pushed particularly well across the blowing assembly. It is in particular thereby prevented that the packaging material catches on the blowing assembly and is not properly supplied to the sealing unit and/or the cutting device.

The packaging material may be detached or released particularly well from the surface of the blowing assembly when the blowing element is moveable orthogonally relative to the surface of the housing. Alternatively, it is possible that the blowing element is disposed movably about a pivot axis so as to be pivoted between the first and the second position. This can be advantageous when moving a heavy blowing element from the first to the second position.

A guide section can be formed in the housing in which the blowing element is movably arranged. By means of the guide section it is possible to specify a desired direction of movement for the blowing element in which it moves between the first and the second position. Finally, the guide section enables the blowing element to not get jammed during movement between the first and the second position.

In order to move the blowing element particularly quickly between the first and the second position, the housing comprises a compressed air port, via which the compressed air is supplyable into the guide section. In this, the compressed air port can be provided centrically or eccentrically relative to the guide section in the housing. If the compressed air port is provided centrically relative to the guide section in the housing, then the blowing element can move in a particularly uniform manner in the guide section between the first and the second position without jamming By means of an eccentric arrangement of the compressed air port, it is possible to account for constructive framework conditions which are given by a packaging device in which the blowing assembly according to the invention is used.

In one embodiment, the guide section comprises an aperture through which the blowing element protrudes when it is in the second position. It is possible to lower the blowing element into the guide section of the housing through the aperture when it moves from the second to the first position. In addition, the aperture can be designed such that it ensures tight guidance of the blowing element, which can also prevent that impurities pass through the aperture to the guide section.

In order to, in a particularly simple manner, prevent the blowing element from detaching from the housing, the housing may comprise at least one stop which holds the blowing element at the housing when the blowing element is in the second position.

Furthermore, it can be provided that the blowing element comprises an inlet, via which air can be introduced into a channel provided in the blowing element. By means of the inlet, the channel can be uniformly filled with compressed air to bring the blowing element in the guide region from the first to the second position in a responsive and smooth manner.

In order for the blowing element to be moveable in a responsive and reliable manner, i.e. without any jamming, between the first and the second position, it may be provided that an under side of the blowing elements has a larger area than the inlet. The blowing element may comprise a flange which on its under side has a larger area than the inlet. On the under side, the flange can in a uniform manner be impinged by compressed air, so that the blowing element can move in the guide section without getting jammed. In addition, the upper side of the flange can be used as a stop in order to hold the blowing element securely at the housing and/or the flange can carry a sealing element.

In order to have the excess bag necks be removed well by the blowing assembly in particular after raising the blowing element, the blowing clement can comprise air apertures through which air can flow from the blowing element. Preferably, the compressed air used to raise the blowing element is only flowable through the air apertures when the blowing element is in the second position. It is thereby possible to first mechanically raise the excess bag necks by means of the blowing element before they are blown away by the blowing assembly by means of the compressed air flowing from the air apertures.

According to another embodiment of the invention, the air apertures are formed such that the air flow generated by them can be directed in different directions, in particular above and/or to the front, away from the blowing assembly. This makes it possible to blow away the severed bag necks particularly well from the blowing assembly.

Another embodiment of the invention relates to an abutment with a blowing assembly according to one of the previously described kinds, where the housing of the blowing assembly is integrally formed with a counter-pressure plate of the abutment. The abutment is together with the blowing assembly well suited to be used for a sealing device to reliably blow away bag residues from the abutment.

Alternatively, it is possible that the blowing assembly is detachably attached to the counter-pressure plate of the abutment or generally to the sealing unit, for example by means of a screw connection. This would have the advantage that the blowing assembly, either for cleaning or repair purposes, could be easily and quickly removed from the abutment. Moreover, upon customer request, an already existing abutment could thus be upgraded to a blowing assembly according to the invention.

The invention also relates to a method for removing excess packaging material from a blowing assembly which can be used for a sealing unit provided in a packaging device. The blowing assembly comprises a housing with a blowing element movably arranged therein. It is provided according to the invention, that the blowing element can be impinged by compressed air to be moved relative to the housing from a first position, in which it is lowered at least partially into the housing, to a second position, in which it at least partially projects above a surface of the housing, so that it raises the excess packaging material. After the excess packaging material is at least partially raised, compressed air is flowed at least partially through air apertures provided in the blowing element to blow away the raised excess packaging material from the blowing assembly.

By means of the blowing element integrated into the blowing assembly, excess packaging material, such as severed bag necks, can first be loosened or detached by the blowing assembly by raising it and subsequently or simultaneously by effectively blown away by the outflowing compressed air.

In one embodiment of the invention, the blowing element is impinged by compressed air during or after a cover of the packaging device moves from a closed position to an open position to at least in partially open a gap of an extractor. It is thereby possible to convey the excess packaging material, removed by means of the blowing elements, via the gap into the extractor, from which it is dischargeable from the packaging device.

According to another embodiment of the invention, it is provided that the blowing element is impinged by compressed air at most until a time, at which the cover engages with a frame of the packaging device for lifting the latter, so that the gap is fully opened. It is thereby prevented, that excess packaging material is blown away across the gap past the extractor, when the frame is additionally raised.

It is alternatively also possible, however, to have the blowing element be impinged by compressed air after a time, at which the cover engages with a frame of the packaging device for lifting the latter, so that the gap is fully opened. In this embodiment, however, an additional wall is provided as an impact protection, which is arranged such that the bag necks blown away from the blowing assembly fly against it and bounce off it through the fully open gap into the extractor. It is thereby possible to reliably transport especially large packaging material residues from the blowing assembly through the completely opened gap into the extractor.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Identical components are designated by identical reference numerals throughout the figures.

DETAILED DESCRIPTION OF THE INVENTION

Figure 1:
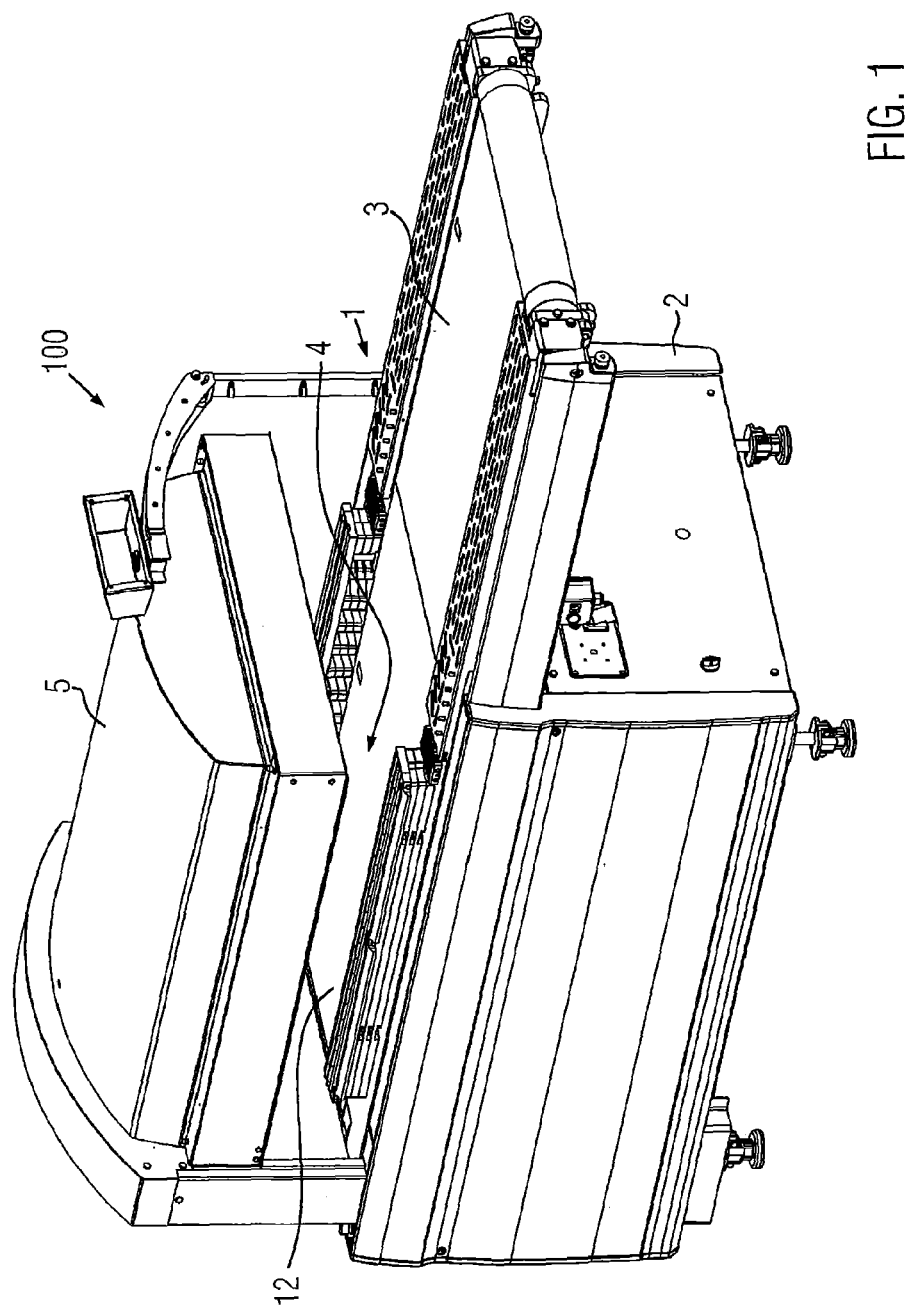
FIG. 1 is a side perspective view of a chamber conveyor belt machine in which a blowing assembly according to one embodiment of the present invention is applicable or with which a method according to one embodiment of the present invention can be performed.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a schematic view of a chamber conveyor belt machine 100 comprising a conveyor belt 1, a frame 2, a placement area 3, a chamber 4 and a cover 5. The chamber 4 is formed by the cover 5 together with a bottom part 12, where the cover 5 for example automatically opens in a motor-operated manner or can be opened manually, in order, for example, to receive bags 13 to be evacuated or to be sealed (see FIG. 2), which are automatically fed by the conveyor belt 1 and which subsequently automatically closes to form the chamber 4.

Figure 2:
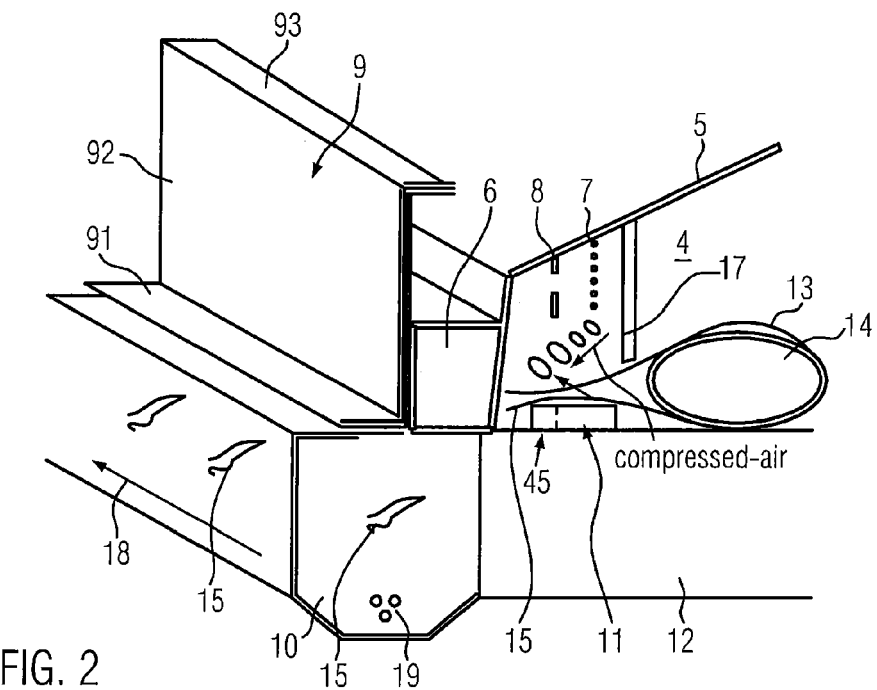
FIG. 2 is a partial side perspective view of a packaging device with a blowing assembly according to one embodiment of the present invention for removing bag necks, where the blowing assembly is formed integrally with an abutment.

FIG. 2 shows a schematic section of the chamber conveyor belt machine 100. The cover 5 may be provided with a carrier 6, which is provided at the bottom edge of the cover 5 and extends substantially as a square profile into or out of the drawing plane, respectively, across the entire length of the chamber 4. The cover 5 together with the bottom part 12 forms the chamber 4. In the chamber 4, the bag 13 is provided, in which there is a product 14. The bag 13 has a bag neck 15 which in the chamber 4 extends in the direction of the carrier 6. On the inner side of the cover 5, a sealing device 7 and a cutting device 8 are provided, which in the region of the bag neck 15 extends into the chamber 4. The sealing device 7 and the cutting device 8 co-act with an abutment 11, which is provided at the bottom part 12 and extends into or out of the drawing plane, respectively, across the entire length of the chamber 4. Beside the abutment 11, the blowing assembly 45 according to the invention is schematically shown. The abutment 11 and the blowing assembly 45 according to the invention shall be described later in detail, in particular with reference to FIGS. 4 and 5. The sealing device 7 and the cutting device 8 can be lowered together or independently of each other.

Furthermore, beside the bottom part 12, an extractor 10 is provided which is formed as a suction duct and which extends into or out of the drawing plane, respectively, across the entire length of the chamber 4. The top side of the extractor 10 is essentially located on the level of the top side of the bottom part 12. In the front view of the chamber conveyor belt machine, in the upper right-band region of the extractor 10, a gap 16 (see FIGS. 7d-7i) is provided, which is closed by the bottom surface of the carrier 6 when the cover 5 is in a lowered or closed position. Moreover, the gap 16 can be closed by a protective frame 9 which extends substantially into or out of the drawing plane, respectively, across the entire length of the chamber 4. The protective frame 9 in FIG. 2 has the shape of a step from the bottom left to the upper right. A first protective frame plate 91 may be disposed substantially parallel to the bottom and partially closes the gap 16 (see FIGS. 7d-7i). A second protective frame plate 92 may connect thereto and extend substantially orthogonally to the bottom towards the top. Connecting thereto, a third protective frame plate 93 may extend at the upper end of the second protective frame plate 92 substantially parallel to the bottom towards the right. The first protective frame plate 91 is, when the cover 5 is in a lowered position, located on the same level as the lower surface or the lower edge of the carrier 6, respectively.

Furthermore, a compressed air device 17 is provided in FIG. 2. In addition to the compressed air flow generated by the blowing assembly 45, it is optionally provided, as will be described later, to supply compressed air for removing the severed bag necks 15. Finally, FIG. 2 illustrates a suction device 18 in the extractor 10 by means of a solid arrow. It serves to have the severed bag necks 15 be sucked into the extractor and removed along the extractor 10. For improved removal of the bag necks 15 from the extractor 10, bores 19 are provided on the front side of the extractor 10, so-called false air holes, the function of which is described below. The bores 19 are not limited to the shape shown, but rather, a single bore 19 or a plurality of bores or apertures of any shape can be provided. Providing the compressed air device 17, the suction device 18 and the bores 19 is not absolutely necessary for effective removal of the severed bag necks 15 from the blowing assembly 45 according to the invention.

Figure 3:
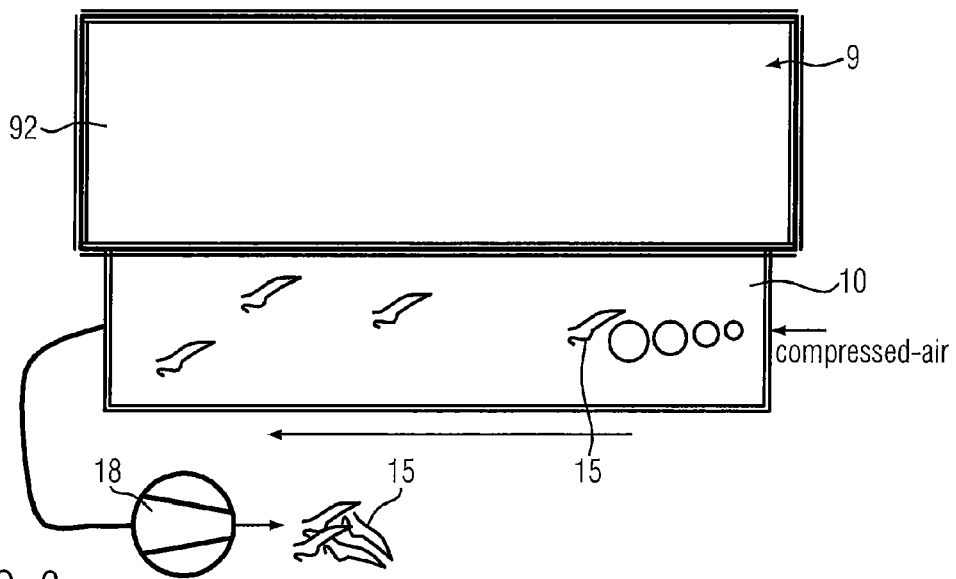
FIG. 3 is a schematic side view of the packaging device of FIG. 2.

FIG. 3 shows a schematic front view of the device of FIG. 2. According to FIG. 3, the suction device 18 is arranged outside of the extractor 10. The bag necks 15 are in FIG. 3 sucked out by the suction device 18 from the extractor 10 in the direction of the solid arrow. Alternatively to the suction device 18, a blowing device functionally connected to the extractor 10 can also be provided to blow out the bag necks 15 from the extractor 10 using compressed air. Airflow through the extractor 10 is achieved due to the bores 19 even without any blowing device, but only by means of the suction device 18.

Figure 4:
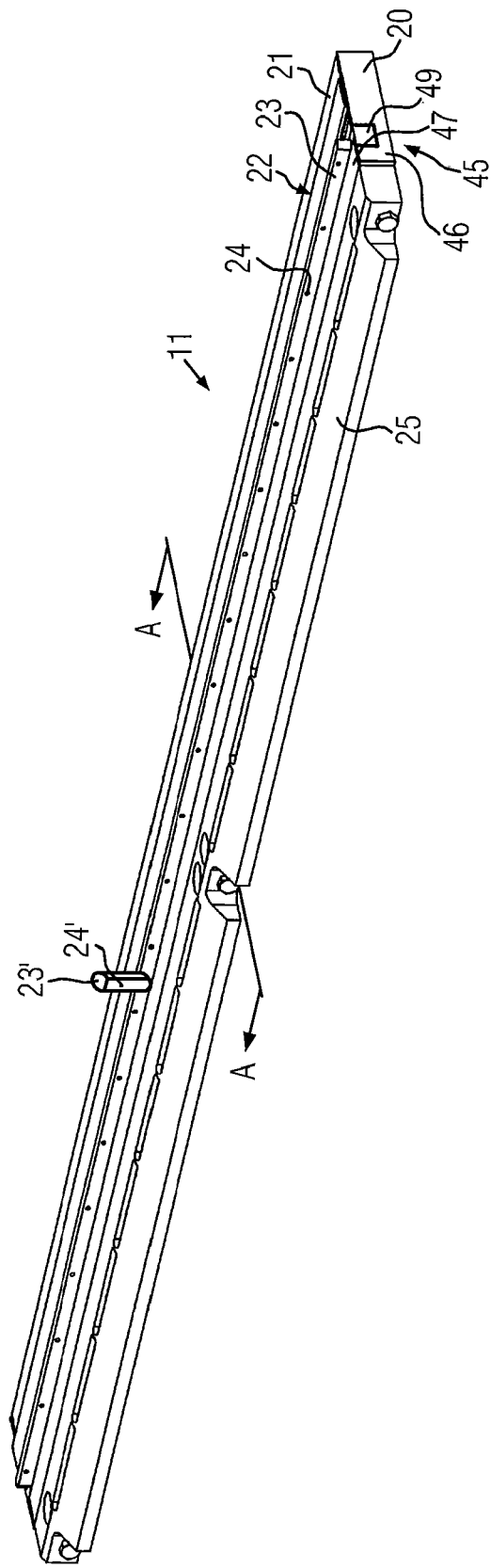
FIG. 4 is a side perspective view of a blowing assembly according to one embodiment of the present invention that is integral with an abutment of a sealing device.

In FIG. 4, the blowing assembly 45 according to the invention is integrally installed in the abutment 11. The abutment 11 comprises a counter-pressure plate 20, on which, as will be later explained, a sealing as well as a cutting operation takes place in order to close the bag 13 and to sever the bag neck 15.

The blowing assembly 45 comprises a housing 46 having a surface 47 from which a blowing element 22 protrudes. The blowing element 22 is according to FIG. 4 a blowing rail 23 arranged across the entire width of the blowing assembly 45. The blowing rail 23 can comprise equidistantly spaced air apertures 24 through which compressed air can flow from the blowing rail 23. Attached to the blowing assembly 45 may be a ramp section 25, which is predominantly bolted to the housing 46.

FIG. 4 also shows a blowing pin 23' with an air aperture 24'. The blowing assembly 45 according to the invention can as an alternative to the blowing rail 23 comprise at least one, but preferably a group of blowing pins 23'. The blowing pin 23' is movably arranged in the counter-pressure plate 20. When having a group of blowing pins 23', they can be provided equidistantly across the width of the blowing assembly 45. The blowing pin 23' has a rotationally symmetrical shape. The blowing pin 23' also comprises an anti-rotation lock, not shown, which ensures that it does not rotate with a movement between the first and the second position. It is thereby possible to maintain a desired orientation of the air aperture 24'.

Finally, FIG. 4 shows a cover cap 49 which is detachably attached laterally on the housing 46. By removing the cover cap 49, an operator can extract the blowing rail 23 from the guide section 29 of the housing 46, for example for cleaning purposes. The cover cap 49 can be provided on both sides of housing 46.

Figure 5:
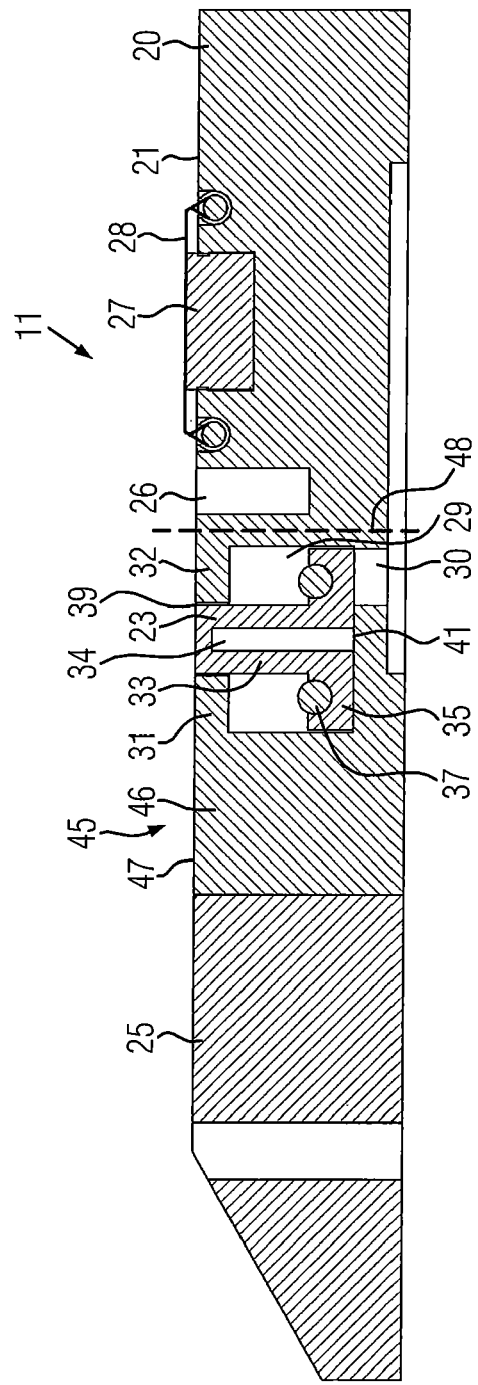
FIG. 5 is a cross-sectional view of the abutment of FIG. 4 taken generally along line A-A illustrating the blowing element in a first position.

FIG. 5 shows the blowing assembly 45 in section A-A according to FIG. 4. In FIG. 5, the blowing rail 23 is in a first position, in which it is in a lowered position in the housing 46 such that it is disposed flush with the surface 47 of the housing 46. The ramp section 25 is arranged adjacent to the housing 46, which ensures that the severed bag necks 15 can be well removed 15 from the blowing assembly as well as from the abutment 11 and not remain lying behind there on the bottom part 12 of the packaging device according to FIG. 2.

The counter-pressure plate 20 of FIG. 5 comprises a surface 21 and furthermore a cutting aperture 26, as well as a sealing element 27 arranged adjacent thereto. During the cutting operation, for severing the bag necks 15 from the bag 13, the cutting device 8 shown in FIG. 2 moves into the cutting aperture 26 for severing the superfluous bag neck 15. For enclosing the product 14 in the bag 13, the sealing device shown in FIG. 2 presses from above onto the sealing element 27. A belt 28, preferably a Teflon belt is disposed on the sealing element 27. It is possible by means of the belt 28 to prevent that the packaging material adheres to the abutment 11 due to the sealing action.

According to FIG. 5, the blowing rail 23 is arranged in a guide section 29 of the housing 46. Furthermore, the counter-pressure plate housing 46 comprises a compressed air port 30, via which compressed air can be supplied into the guide section 29. A first and a second stop 31, 32, are formed on the top side of the housing 46 to hold the blowing rail 23 in the guide section 29 when it moves between the first and a second position (see FIG. 6).

According to FIG. 5, the blowing rail 23 comprises a vertically oriented leg 33 with a channel 34 formed therein. An inlet 41 is also provided in the blowing rail 23 leading into the channel 34. A flange 35 laterally extends from the vertical leg 33, which is shown in FIG. 5 in a sectional view. The vertical leg 33 with the channel 34 as well as the flange 35 extending from the vertical leg 33 can, for example, be produced in a bending process.

A sealing element 37 is arranged on the flange 35 as a sealing ring, which, when seen from the top view, extends around the flange 35 so that it seals the guide section 29 when the blowing rail 23 is in the second position in which the flange 35 pushes upwardly against the first and the second stop 31, 32.

The sealing element 37 prevents the compressed air from exiting the housing 46. In addition, this can prevent occurrence of a sudden loud impact when the blowing rail 23 moves from the first position shown in FIG. 5 to the second position shown in FIG. 6.

An upper section of the vertical leg 33 is disposed in an aperture 39 of the housing 46. The vertical leg 33 of the blowing rail 23 can move through the aperture 39 from the position shown in FIG. 5 to the position described below in FIG. 6.

FIG. 5 could just as well be a sectional view through the blowing pin 23' shown in FIG. 4 as an alternative to the blowing rail 23. If several blowing pins 23' are provided, then they can move synchronously through the aperture 39 of the housing 46 between the first and the second position described below. A respective cylindrical aperture 39 is formed for each of the blowing pins 23' in the housing 46.

Figure 6:
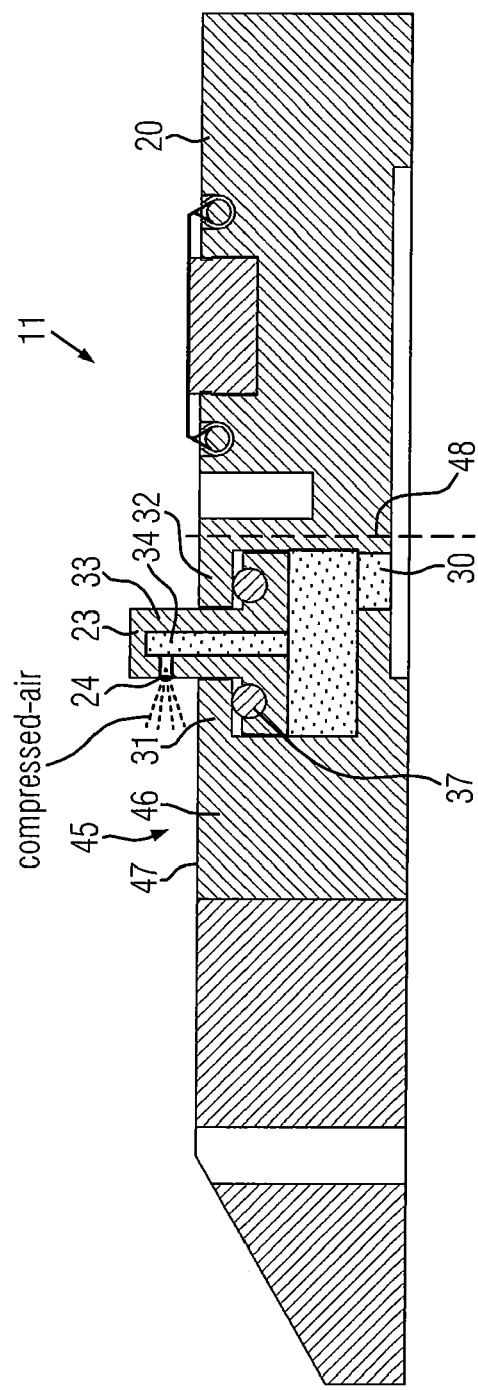
FIG. 6 is a cross-sectional view of the abutment of FIG. 4 taken generally along line A-A illustrating the blowing element in a second position.

FIG. 6 shows the sectional view A-A of FIG. 4, where the blowing rail 23 or the blowing pin 23', respectively, is in the aforesaid second position in which the vertical leg 33 extends beyond the surface 47 of the housing 46. In this position of the blowing rail 23, there is compressed, air being shown as dots, in the guide section as well as in the channel 34 of the blowing rail 23. The air pressure is introduced via the compressed-air port 30 into the guide section 29 and from there via the inlet 41 into the channel 34.

In FIG. 6, the sealing element 37 respectively presses against a bottom side of the first and the second stop 31, 32. At the latest when the blowing rail 23 is in the second position according to FIG. 6, the compressed air exits the channel 34 via the air apertures 24, 24' already shown in FIG. 4. One or more bag necks 15 severed above the abutment 11 can thereby first be raised by the blowing rail 23 above the blowing assembly 45, in order to ultimately be blown away by the compressed air flowing out from the air apertures 24.

Operation of the blowing assembly 45 according to the invention shall be described below.

FIGS. 7a-7j show how the blowing assembly 45 according to the invention is used. For this, reference is made to the device according to FIG. 2.

Figure 7A:
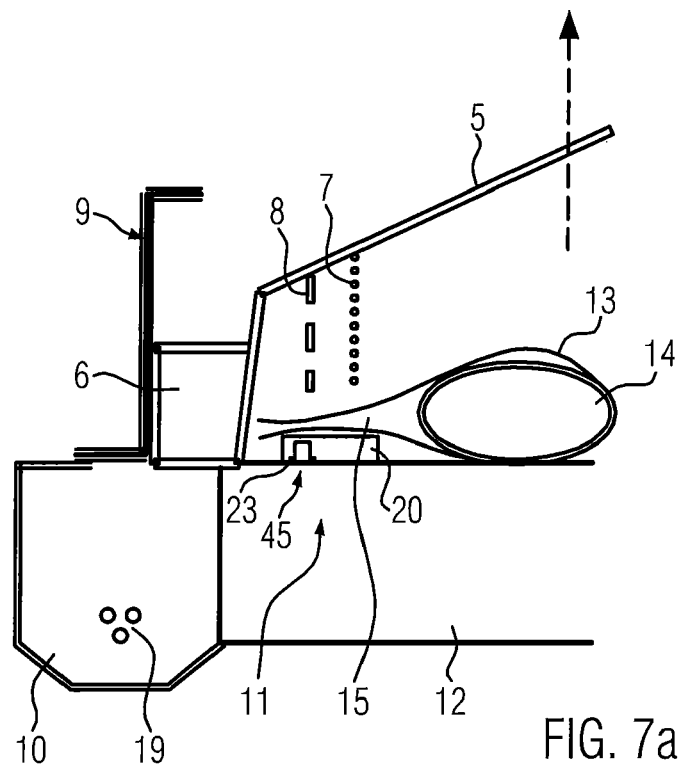
FIGS. 7a through 7j illustrate method steps according to one embodiment of the present invention, where a blowing assembly according to one embodiment of the present invention is integrally formed with an abutment in the packaging machine.

As shown in FIG. 7a, the cover 5 is in a lowered position. The chamber 4 is in this step evacuated (dashed arrow). The blowing rail 23 is in the first position in which it is lowered in the housing 46.

Figure 7B:
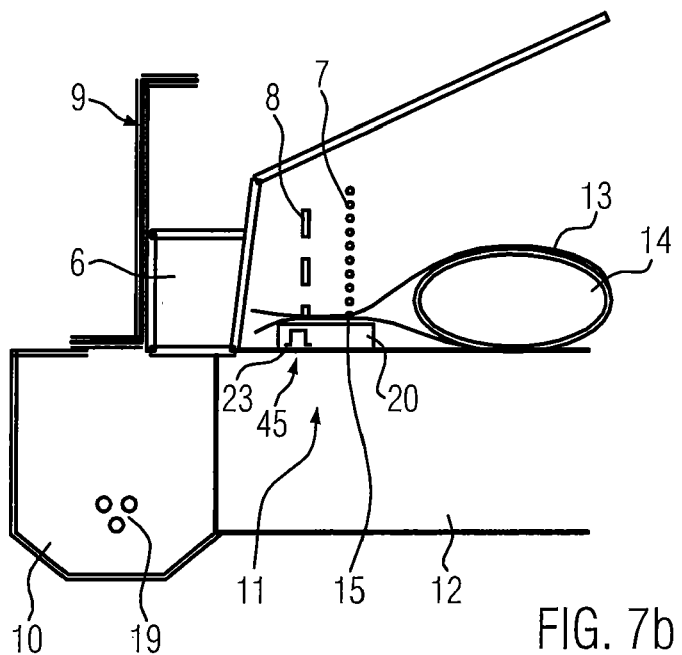

According to FIG. 7b, the sealing device 7 and the cutting device 8 are lowered and co-act with the abutment 11. The bag 13 is sealed and cut in the region remote from the bag neck 15. Also during this step, the blowing rail 23 is in a lowered position in the housing 46.

Figure 7C:
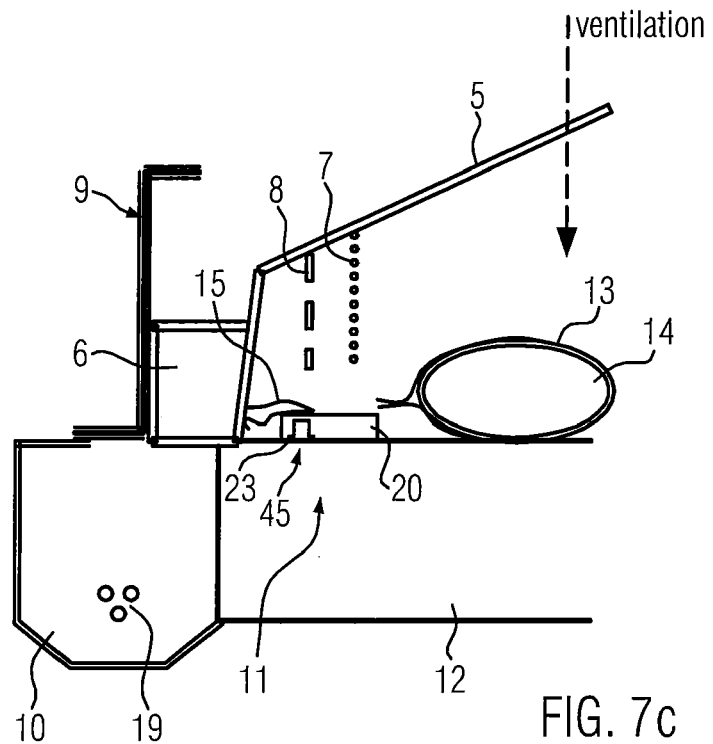

According to FIG. 7c, the severed bag neck 15 rests on the blowing assembly 45. The chamber 4 is ventilated (dashed arrow) and the product 14 sealed in the bag 13 is ready for transportation. In FIG. 7c, the blowing rail 23, in schematic illustration, is still in the first position in which it is in the lowered position in the housing 46.

Figure 7D:
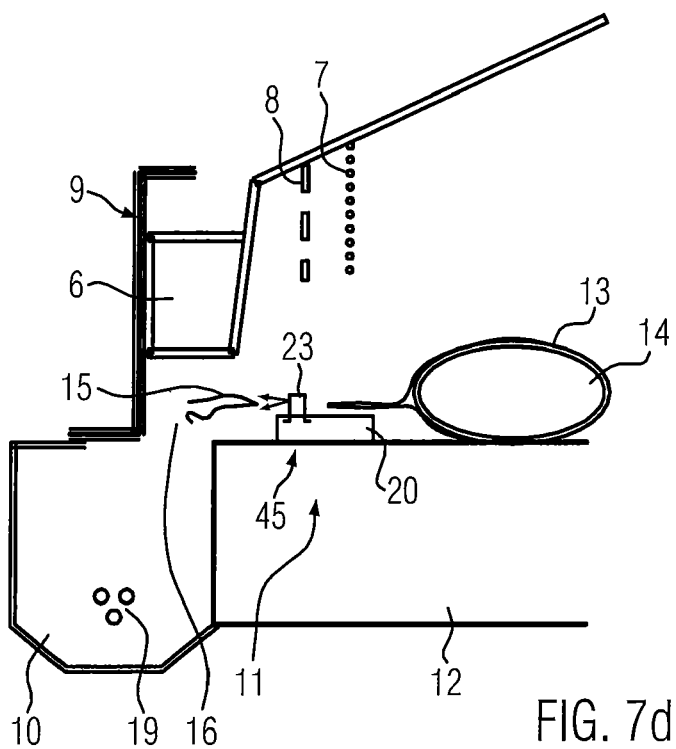

In FIG. 7d, the cover 5 is raised together with the carrier 6 and the sealing device 7 as well as the cutting device 8. The gap 16 opens and has a first opening width. From a predetermined opening width of the gap 16, the blowing assembly 45 according to the invention is impinged by compressed air, so that the blowing rail 23 moves to the second position in which it protrudes from the housing 46. The compressed air, which was used for extending the blowing rail 23 from the position shown in FIG. 7c to the second position shown in FIG. 7d, passes via the inlet 41 into the channel 34 and flows out from the air apertures 24 (see FIG. 6) in order to convey the severed bag neck 15 via the opened gap 16 into the extractor 10. In addition to the compressed air flowing from the air apertures 24, in particular small or short bag necks 15 are sucked into the extractor 10 by means of the suction effect generated by the suction device 18 (see FIG. 3). The suction effect is enhanced by the narrow gap 16 having the first opening width.

Figure 7E:
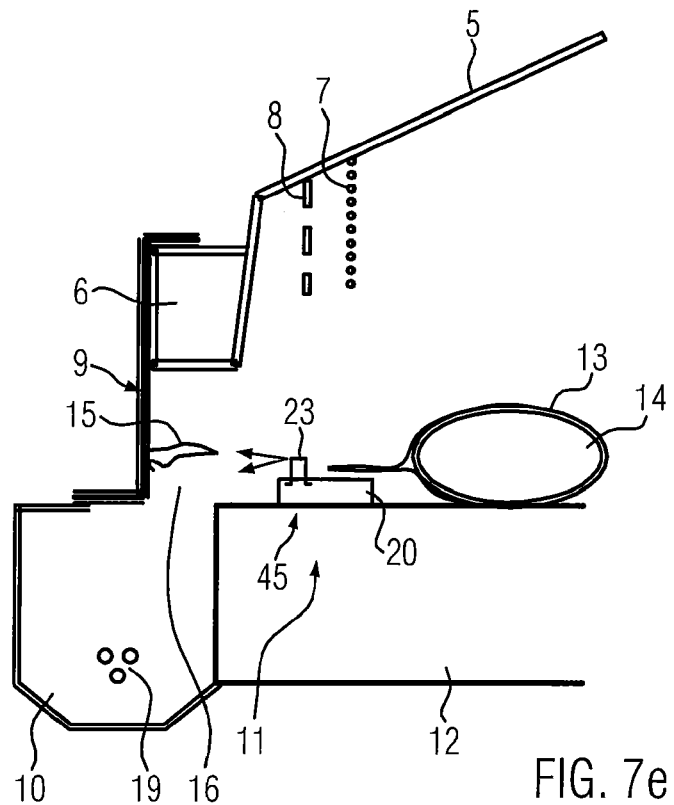

According to FIG. 7*e*, the cover 5 is in a first raised position, in which the upper surface of the carrier 6 contacts the inner surface of the third protective frame plate 93 (see FIG. 2) of the protective frame 9, but the first protective frame plate 91 (see FIG. 2) still contacts the upper surface of the extractor 10 and closes part of the gap 16. The bag necks 15 continue to be blown into the extractor 10 by the compressed air flowing out from the air apertures 24, where they partially bounce off the second protective frame plate 92 into the extractor 10.

Figure 7F:
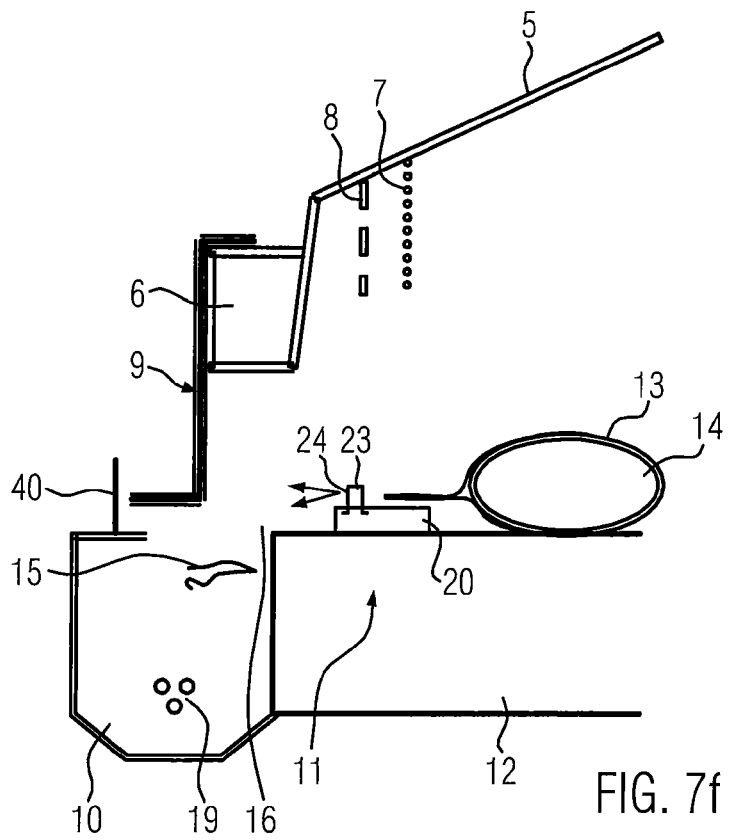

As shown by FIG. 7*f*, the cover 5 is further raised and the protective frame 9 is likewise raised by the positive-fit connection between the carrier 6 and the third protective frame plate 93 (see FIG. 2). In this manner, the gap 16 enlarges to a second opening width, in which it is completely open. Now also larger or longer bags necks 15 can blown through the gap 16 into the extractor 10 by means of the compressed air flowing out from the abutment 11. In order for the bag necks 15 despite raising the frame 9 are not blown across beyond the gap, a wall 40 is provided on the extractor 10 as an impact protection. The bag necks 15 can from there be directed into the extractor 10. Even before enlargement of the gap 16, long bag necks 15 usually extend beyond it or abut the guard frame 9, respectively.

Figure 7G:
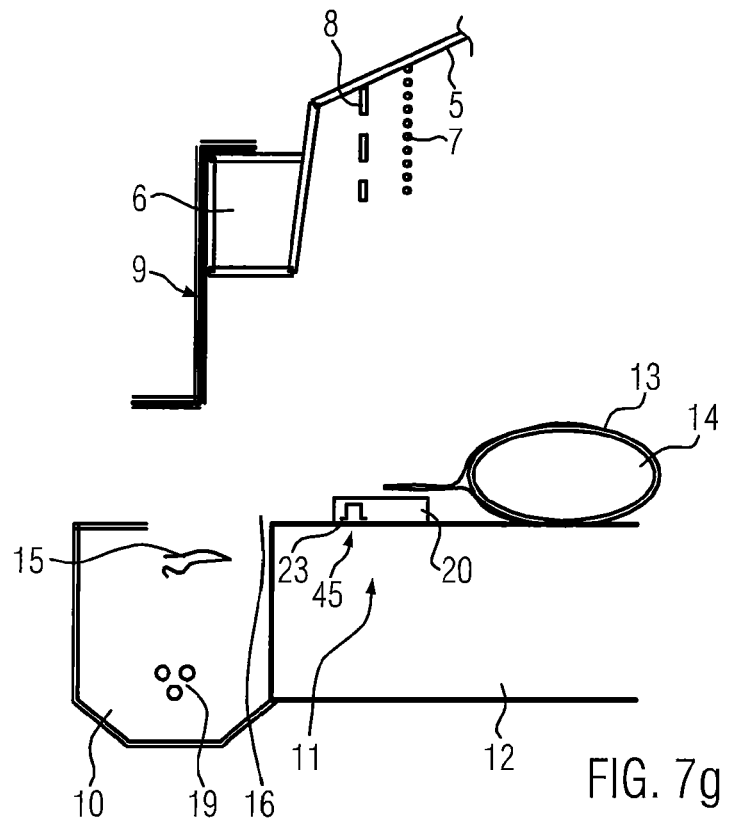

In FIG. 7*g*, the cover 5 has reached its uppermost position where the extractor 10 or the gap 16, respectively, is fully opened. Large bag necks 15 can due to gravity and the aforementioned suction effect drop into the extractor 10 and are then removed. By switching off the compressed air, the blowing rail 23 returns to the first position.

Figure 7H:
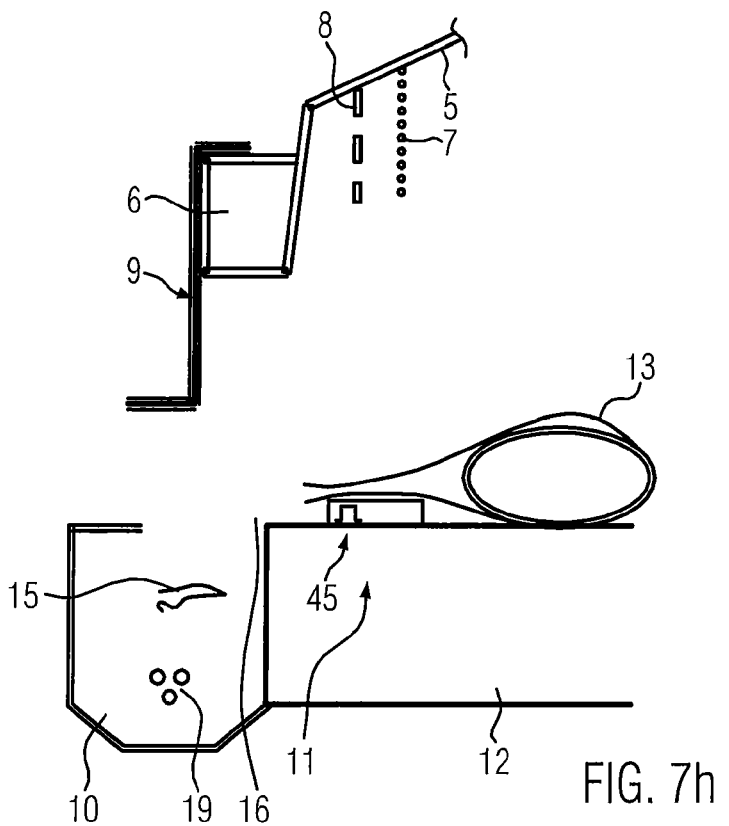

According to FIG. 7*h*, the products 14 shown during the previous method steps are removed and new bags 13 filled with products to be sealed have been transported into the chamber 4.

Figure 7I:
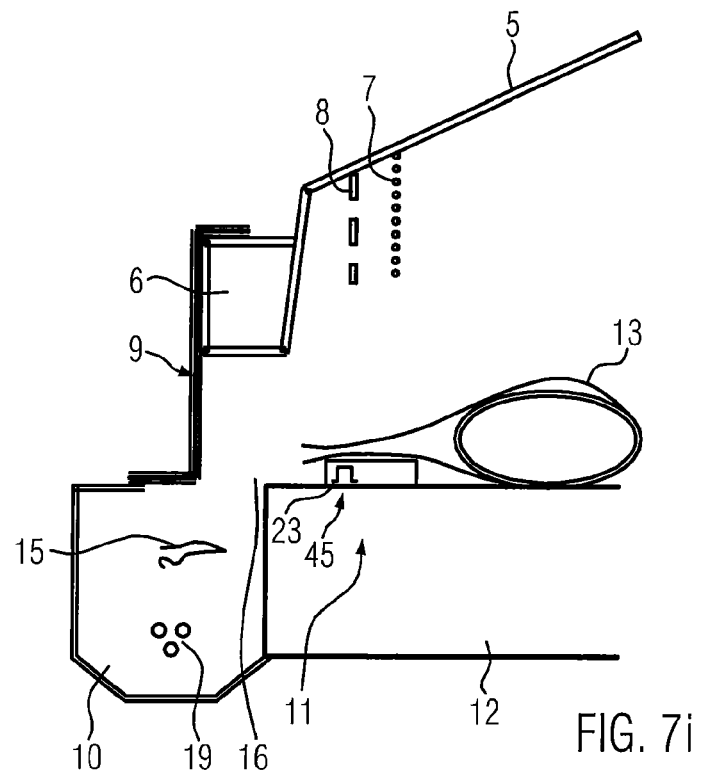

In FIG. 7*i*, the cover 5 again closes and the protective frame 9 or the first protective frame plate 91, respectively, (see FIG. 2) closes part of the gap 16. The gap 16 has now returned to its first opening width. The severed bag necks 15 located in the extractor 10 are sucked away or blown away with the aid of compressed air.

Figure 7J:
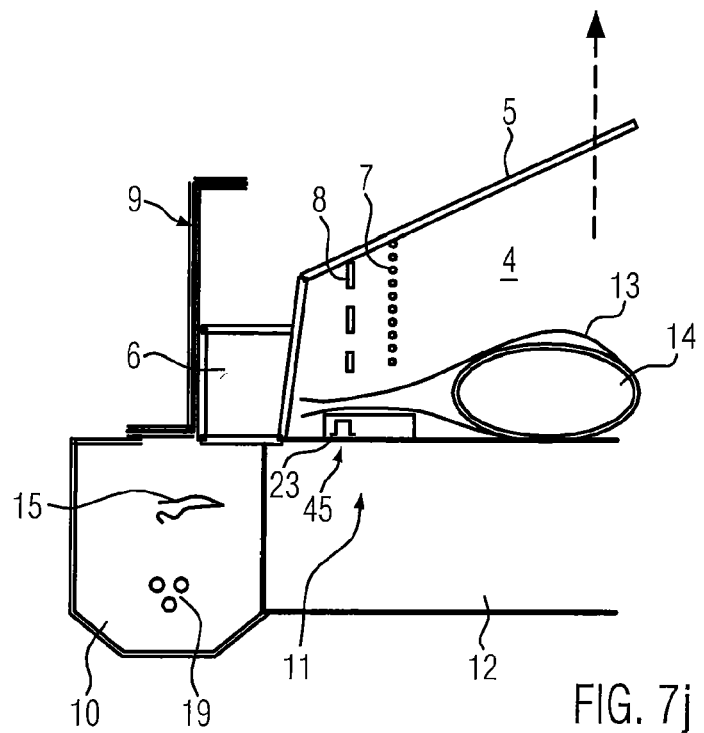

In FIG. 7*j*, the protective frame 9 and the cover 5 completely close the gap 16. The device again returns to its initial position (see FIG. 7*a*). The method begins anew with the evacuation of chamber 4.

The blowing assembly according to the invention can be used in various packaging devices and is not limited to the previously described chamber conveyor belt machine. The blowing assembly 45 can additionally be easily integrated advantageously in an abutment of a sealing device.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A blowing assembly for a sealing unit of a packaging device, said blowing assembly comprising:
    a housing; and
    at least one blowing element which is movable relative to said housing between a first position in which said blowing element is lowered at least partially into said housing, and a second position in which said blowing element at least partially projects above a surface of said housing, wherein said blowing element comprises one of a blowing rail or at least one blowing pin.

2. The blowing assembly according to claim 1, wherein said blowing element is arranged flush with said surface of said housing when said blowing element is in said first position.

3. The blowing assembly according to claim 1, wherein said blowing element is orthogonally movable relative to said surface of said housing.

4. The blowing assembly according to claim 1, wherein in said housing, a guide section is formed in which said blowing element is movably arranged.

5. The blowing assembly according to claim 4, wherein said housing comprises a compressed air port, wherein a volume of compressed air is supplied into said guide section through said compressed air port.

6. The blowing assembly according to claim 4, wherein said guide section comprises an aperture through which said blowing element protrudes when said blowing element is in said second position.

7. The blowing assembly according to claim 1, wherein said housing comprises at least one stop which holds said blowing element at said housing when said blowing element is in said second position.

8. The blowing assembly according to claim 1, wherein said blowing element further comprises an inlet, wherein a volume of air is introduced into a channel provided in said blowing element through said inlet.

9. The blowing assembly according to claim 8, wherein an under side of said blowing element has a larger area than said inlet.

10. The blowing assembly according to claim 1, wherein said blowing element comprises said blowing rail, and said blowing element further comprises a plurality of air apertures through which air can flow out from said blowing element.

11. The blowing assembly according to claim 1, wherein said blowing element further comprises at least one sealing element for preventing sudden impact of said blowing element against said housing.

12. The blowing assembly according to claim 1, wherein said blowing assembly is incorporated with an abutment for a sealing unit of a packaging device and wherein said housing is integrally formed with a counter-pressure plate of said abutment.

13. A blowing assembly for a sealing unit of a packaging device, said blowing assembly comprising:
   a housing; and
   at least one blowing element which is movable relative to said housing between a first position in which said blowing element is lowered at least partially into said housing, and a second position in which said blowing element at least partially projects above a surface of said housing, wherein said blowing element is arranged flush with said surface of said housing when said blowing element is in said first position.

14. A blowing assembly for a sealing unit of a packaging device, said blowing assembly comprising:
   a housing;
   at least one blowing element which is movable relative to said housing between a first position in which said blowing element is lowered at least partially into said housing, and a second position in which said blowing element at least partially projects above a surface of said housing; and
   a guide section formed in said housing, wherein said blowing element is movably arranged within said guide section.

* * * * *